June 25, 1968 W. F. LUDWIG Re. 26,415
DRUMHEAD CONSTRUCTION
Original Filed July 25, 1960
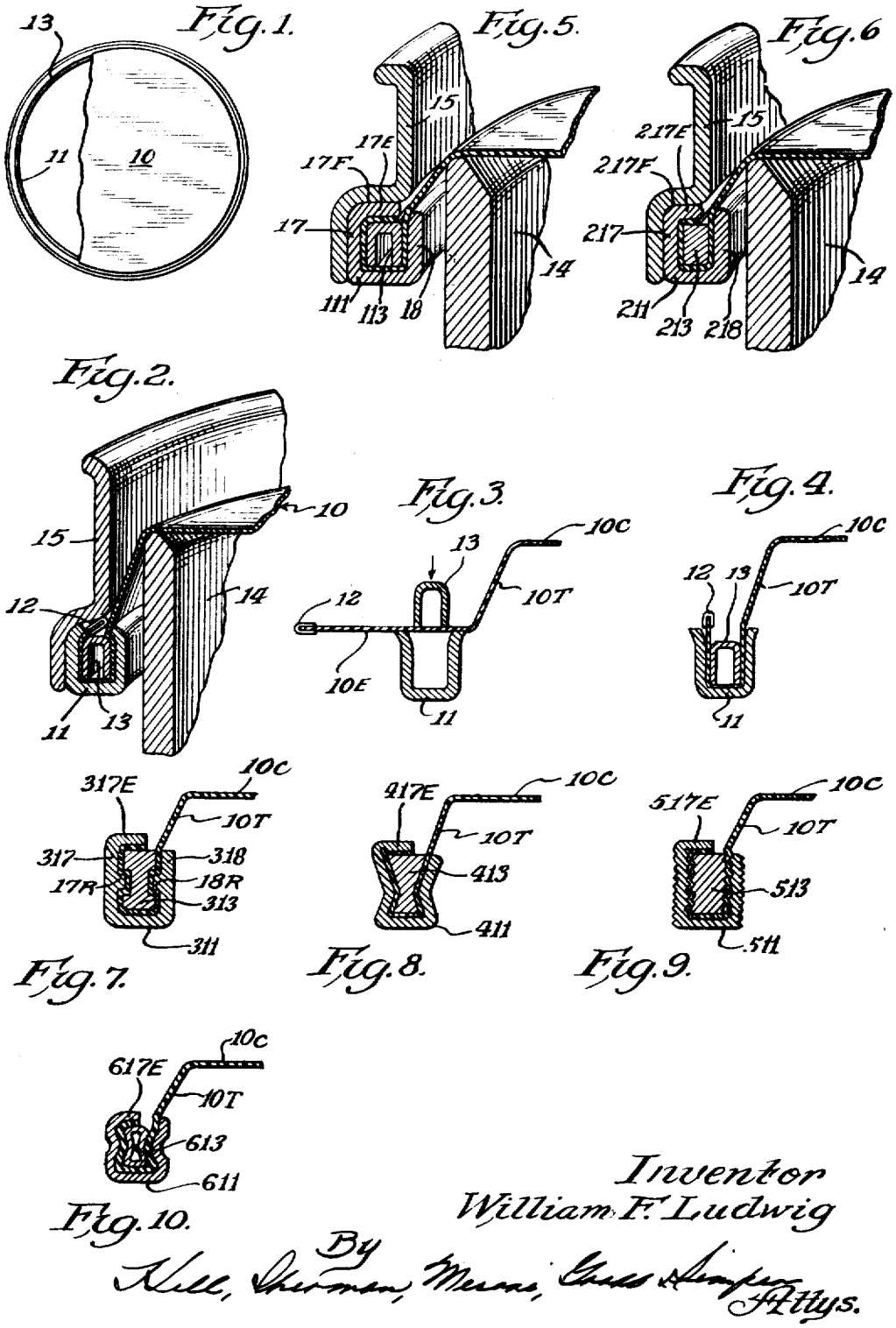
Inventor
William F. Ludwig
By
Kile, Sherman, Meers, Gross & Simpson
Attys.

United States Patent Office

Re. 26,415
Reissued June 25, 1968

26,415
DRUMHEAD CONSTRUCTION

William Fredrich Ludwig, Chicago, Ill., assignor to Ludwig Drum Co., a corporation of Illinois Original No. 2,979,981, dated Apr. 18, 1961, Ser. No. 44,929, July 25, 1960. Application for reissue Oct. 23, 1965, Ser. No. 506,146
7 Claims. (Cl. 84—411)

Matter enclosed in heavy brackets [ ] appears in the original patent but forms no part of this reissue specification; matter printed in italics indicates the additions made by reissue.

ABSTRACT OF THE DISCLOSURE

*An adhesive-free drumhead construction comprising a pair of nested inner and outer rings of conforming, generally rectangular cross-section, the outer of said rings having a channel with a full length access opening in a direction generally normal to the plane of the ring for receiving the margin of a plastic drumhead sheet spanning said ring, the marginal edge flange of the sheet lining and in direct contact with the walls of the channel, the outer ring having initially a longer outer wall the free edge portion of which projects radially inwardly over the inner ring and overlies the marginal edge flange of said drum sheet to establish said rings in tight fit compressional engagement exerting clamping pressure against said marginal edge flange of said drum sheet and thereby gripping the same against slippage even when the drumhead sheet is subjected to high tension shock loads.*

This invention relates to a drumhead construction and to a method of fabricating the same for providing an improved anchoring attachment to the drumhead sheet.

United States Patent No. 2,641,592 to Charles H. Hofrichter discloses a plastic material suitable for service as a drumhead. This material is marketed under the tradename Mylar by E. I. du Pont de Nemours & Co., and has numerous desirable physical properties such as immunities to moisture or weather changes, high tensile strength, great durability and ruggedness, and economy of manufacture. Drumhead sheets of Mylar are well able to withstand tensile loads which may, in frequent instances in the drumhead art, be adjusted to static levels of as much as 1500 to 2000 pounds with the actual impact loading during playing of the drum exceeding these values.

In the application of Mylar as a drumhead, considerable difficulty has been experienced in securing the edge of the drumhead to a suitable anchoring hoop or ring. A number of procedures have been developed, some of which have been marketed, but up until this time they have all been unduly subject to failure due to the edge of the drumhead ripping out of the hoop or ring.

In one construction a molded anchoring rib enlargement on the edge of the drumhead is molded in situ in a slot provided in a ring of channel-shaped cross-section, with suitable epoxy resin systems being employed to form the molded anchoring rib enlargement, but the epoxy resin systems that have been employed to date are not capable of forming a sufficiently strong chemical bond to hold the smooth Mylar sheet, and with time, the epoxy rib crystallizes and is subject to shattering. To prevent the drumhead from slipping out of the epoxy rib, the edge of the drumhead has, in some instances, been provided with holes to permit the epoxy material to flow therethrough and create mechanical interlocking engagement; and in other instances, the edge of the drumhead has been provided with mechanical attachments to provide anchors for embedment in the epoxy rib.

In still other constructions that have been employed, a solid plastic rib is molded around the edge of the drumhead and is shaped to permit it, to itself, function as the anchor hoop. This last-mentioned solid rib construction has also been anchored to the drumhead by providing holes in the drumhead to permit of a plastic interlock or by providing fasteners such as staples.

To date, the Mylar drumhead sheet too frequently ripped out, principally because the sheet fracture at the region of the holes to break the mechanical interlock while the sheet sections between the holes pull free because of the inability of the epoxy rib to adhere to the Mylar drumhead.

The principal object of the present invention is to provide a totally mechanical anchoring arrangement: that grips the edge of the drumhead between a pair of clamping rings that are fixed against dislodgement by a mechanical interlock therebetween; that applies high clamping pressures for establishing slip resistant engaegment with the drumhead sheet without developing sheet fracture; that receives and maintains the counter hoop at a position spaced from contact with the drumhead sheet; that lends itself to high speed mass production; and that is long lived and rugged in use, being insensitive to atmospheric conditions and to rough handling.

Briefly, the inventive concept embraces a mechanical clamping construction for gripping the marginal edge of the drumhead wherein a pair of slip resisting rings are nested with one completely within the mounting slot of the other in close fitting clamping engagement against opposite surfaces of the drumhead edge that is disposed as a liner between the assembled rings and the form of the assembly is mechanically changed to develop high clamping pressures upon the drumhead edge and to create a strong mechanical interlock that maintains the rings in their assembled high clamping engagement against the drumhead edge. The outer hoop has a generally channel shaped cross-sectional configuration forming a mounting slot in which the inner hoop is received. This construction successfully establishes and maintains an effective mechanical grip upon the smooth surface of the drumhead without dependence on any adhesive formulations and thus eliminates the production problems inherent in the handling of the specialized adhesive systems.

The drumhead is preferably formed with a generally circular central crown portion, an intermediate vertical flange portion depending from the outer margin of the crown and constituting a tuning collar, and a generally horizontally outwardly extending marginal edge flange offset beneath the plane of the crown. The formed drumhead sheet is disposed with its outer edge flange overlying the open face of the slot of the outer ring and the inner ring is then forced downwardly into the outer ring to draw the marginal edge flange of the drumhead into the slot as a liner that assumes the configuration of the slot and that is held tight by the clamping pressures developed between the rings. With the inner ring thus seated in nested relation within the outer ring, one or both rings are deformed to establish a mechanical interlock therebetween for permanently locking the rings together with sufficient clamping pressures existing upon the drumhead edge to prevent slippage even under the severe loading to which it will be subjected in use.

Other objects and advantages will become apparent during the course of the following description.

In the drawings:

FIG. 1 is a top plan view of a drumhead with a portion of the drumhead sheet broken away to disclose the configuration of the clamping ring arrangement;

FIG. 2 is a fragmentary perspective view through a section of one embodiment of a drumhead constructed in accordance with this invention and showing the drumhead in association with a drum body and counter hoop, these parts also being shown fragmentarily and in section;

FIG. 3 is a fragmentary diagrammatic detailed cross-sectional view illustrating the relative position of the parts of the drumhead shown in FIG. 2 at a preliminary stage in the fabrication of the drumhead structure;

FIG. 4 is *a* related fragmentary diagrammatic detailed cross-sectional view illustrating a subsequent step in the fabrication of the drumhead structure shown in FIG. 2;

FIG. 5 is a fragmentary perspective cross-sectional view corresponding to that of FIG. 2 and illustrating an alternative and preferred constructional embodiment for large diameter drumheads in accordance with the invention;

FIG. 6 is a fragmentary perspective cross-sectional view corresponding to that of FIG. 5 and illustrating an alternative and preferred constructional embodiment for small diameter drumheads in accordance with the invention;

FIG. 7 is a fragmentary detailed cross-sectional view through a section of another modified embodiment of a drumhead constructed in accordance with this invention [and for illustrative purposes only is along the line A—A of FIG. 1];

FIG. 8 is a fragmentary detailed cross-sectional view through a section of another modified embodiment of a drumhead constructed in accordance with this invention [and for illustrative purposes only is along the line A—A of FIG. 1];

FIG. 9 is af ragmentary detailed cross-sectional view through a section of another modified embodiment of a drumhead constructed in accordance with this invention [and for illustrative purposes only is along line A—A of FIG. 1]; and FIG. 10 is a fragmentary detailed cross-sectional view through a section of another modified embodiment of a drumhead constructed in accordance with this invention [and for illustrative purposes only is along the line A—A of FIG. 1].

Referring now to the drawing, the plan view of FIG. 1 illustrates a drumhead and anchoring hoop arrangement of the type to which the present invention finds important application. The drumhead sheet 10 may be of a plastic material such as Mylar and at its periphery it is to be anchored to the circular hoop or ring 11 which may assume a variety of different constructions. The properties of Mylar which make it ideal as a drumhead material also make it difficult to create a direct chemical bond with moldable material such as results from the formulation of an epoxy resin system, and while the drumhead sheet is desirably strong in tension, it is relatively weak in shear and if fractured during the course of providing holes along its periphery for the purpose of creating a mechanical interlock, it rips out at the region of the holes.

In the embodiment of FIG. 2 there is illustrated a clamping ring construction having an outer ring or hoop 11 of generally channel shaped cross-sectional configuration to provide a mounting slot opening generally normal to the plane of the ring for receiving and containing an inner ring or hoop 13 which is herein illustrated as being of an inverted channel shaped cross-sectional configuration but which may be of other constructions such, for example, as a solid rectangular configuration.

A binding strip 12 is applied over the marginal edge of the drumhead and is mechanically interlocked thereto by substantially continuous stitching (not shown). In FIG. 2, the completed drumhead is shown applied across the open upper end of a drum body 14 with a counter hoop 15 pressing down on the clamping rings 11 and 13 to tension the drumhead.

As illustrated in FIG. 3, the drumhead is initially formed with a generally circular central crown portion 10C, an intermediate vertical flange portion 10T depending from the outer margin of the crown 10C and constituting a tuning collar, and a generally horizontally extending marginal edge flange 10E offset beneath the plane of the crown 10C. The drumhead is disposed with its marginal edge flange 10E extending across and outwardly beyond the outer ring 11 and the inner ring 13 is located above the slot opening and is then forced downwardly into the slot under high pressure to draw the edge flange 10E of the drumhead into the slot until it is disposed as a [linear] *liner* between the inner and outer rings. In the illustrated arrangement the drumhead edge extends around the inner ring 13 to assume the outline configuration of the slot and to position the binding strip at a location wherein it projects upwardly from along the outer side wall of the outer ring 11.

In the final step of the extremities of the side walls of the outer ring 11 are swaged or rolled into clamping relationship around the inner ring 13 to establish a mechanical interlock between the rings for permanently locking the rings together with sufficient clamping pressures imposed upon the liner 10E to grip it tightly but without rupturing or fracturing the sheet material.

The mechanical clamping arrangement of FIG. 2 has been found to be capable of gripping the extremely smooth drumhead edge 10E without dependence upon adhesives of any type. Important manufacturing advantages are offered by the mechanical clamping structure since all of the equipment for handling epoxy resins and the extreme care, hazards are scheduling difficulties attendant to manufacturing operations involving epoxy resins may be eliminated. In the preferred arrangement of the clamping structure shown in FIG. 2, the outer ring 11 is formed from a sheet metal strip of aluminum that is folded into channel shape and thereafter formed to a circular shape with its opposite ends fixed in abutting relation. Initially, the generally channel shaped cross section of the outer ring 11 is flared slightly outwardly to accommodate insertion of the inner ring 13 for facilitating the assembly process. The ring 13 is preferably of steel and is provided with a coarse, cadmium-plated coating to improve its gripping action on the smooth Mylar drumhead. When the inner hoop or ring 13 has been fully inserted into its mounting slot, the outwardly flared ends of the side walls of the ring 11 are then rolled inwardly to partially overlie the inner ring 13 and clampingly engage it to prevent its withdrawal under the extremely high tension forces existing during use of the drumhead.

It should be noted, however, that there is advantage in employing a stitched anchoring strip 12 since it may more easily be gripped between the two rings 11 and 13 for preventing slippage of the drumhead. The use of a stitched anchoring strip 12 permits a relaxation of the tightness of the fit between the inner and outer rings 13 and 11, respectively, and thus contributes to speedier fabrication. More importantly, however, the stitched anchoring strip 12 can prevent slippage of the drumhead even though in time the outer ring 11 may partially relax its grip upon the inner ring 13. Mylar's unusually smooth and slippery surface would not tolerate any appreciable lessening of the grip between the rings 11 and 13.

A preferred constructional embodiment of the invention that has found marked success is shown in two related versions in FIGS. 5 and 6.

In FIG. 5 the inner ring 113 is again shown as having an inverted generally channel shaped cross-sectional configuration whereas in FIG. 6 the inner ring 213 is shown as having solid generally rectangular cross-sectional configuration. The FIG. 5 version is of lighter weight and is used on drumheads of 20" diameter and larger, whereas the FIG. 6 version is used on drumheads of less than 20" diameter. With either arrangement, the outer ring 111 in FIG. 5 or 211 in FIG. 6 is again of generally channel shaped cross-sectional configuration but it has an outer side wall 17 *in FIG. 5 or 217 in FIG. 6* that is somewhat longer than its inner side wall 18 *in FIG. 5 or 218 in FIG. 6.*

The steps in the fabrication of either of the embodiments of FIGS. 5 and 6 correspond generally to those illustrated in FIGS. 3 and 4. However, after the inner ring 113 in FIG. 5 or 213 in FIG. 6 is seated in nested relation within the mounting slot of the outer ring 111 in FIG. 5 or 211 in FIG. 6, only the extremity 17E *in FIG. 5 or 217E in FIG. 6* of the outer side wall of the outer ring is bent over to overlie the upper face of the inner ring.

Preferably, the drumhead edge 10E is of such dimension that, after being drawn into the mounting slot of the outer ring there remains a tail portion projecting across the uper face of the inner ring so that the bent over end extremity 17E *or 217E* of the outer side wall exerts a positive clamping action directly against the externally projecting tail portion of the drumhead edge.

The bent over free edge 17E *or 217E* of the outer side wall of the outer ring also provides the mechanical interlock for holding the rings in their nested relation to maintain their compressional gripping engagment against the liner. The upper face 17F *or 217F* of the bent over edge 17E *or 217E* of the outer side wall provides a seating surface for the counter hoop 15 and the location of this surface 17F *or 217F* is spaced above the upper extremity of the inner side wall 18 *or 218* so that the counter hoop 15 is supported in spaced relation to the drumhead and, more specifically, the counter hoop 15 is prevented from pinching the drumhead against the inner side wall and cause cutting or fracture of the drumhead sheet 10 at this point.

This preferred arrangement has the additional advantage that the counter hoop 15, in seating against the bent over edge 17E *or 217E* of the outer side wall, acts to continuously load this edge into greater compressional clamping cooperation with the inner ring 113 in FIG. 5 or 213 in FIG. 6 so that as the drumhead tensioning forces become greater the clamping pressures become correspondingly greater for gripping the sheet against slippage.

Another desirable feature of the embodiments shown in FIGS. 5 and 6 is that the outer ring 111 in FIG. 5 or 211 in FIG. 6 may again be formed from a strip of aluminum sheet metal which is readily bendable to the desired shape and this construction technique is inexpensive and creates an effective mechanical interlock.

In FIGS. 7 to 10 are illustrated various alternative clamping arrangements, constructed in accordance with this invention, wherein the inner and outer rings have special complementary interlocking configurations. In the arrangement of FIG. 7 the generally channel shaped outer ring 311 is shown in the form of an aluminum extrusion which in fabrication could originally have its mounting slot flared outwardly sufficiently to accommodate insertion of the large lower end of the inner ring 313. After the inner ring 313 is properly seated within its mounting slot the side walls 317 and 318 of the outer ring are pinched until the internal lengthwise ribs 17R and 18R thereon enter the complementary grooves of the inner ring 313 to create sufficient clamping pressures and a positive mechanical interlock therebetween.

In FIG. 8 the outer ring 411 either may be formed by appropriately bending a flat strip of aluminum or may be formed as an extruded section having side walls flared outwardly sufficiently to define a mounting slot for accommodating insertion of the lower end of the inner ring 413. In this instance each side wall of the outer ring 411 has a V-shaped configuration and the inner ring 413 has its corresponding surfaces provided with a complementary tapered V-shaped configuration. In the FIG. 8 version the outer ring 411 is again pinched to create sufficient clamping pressure and to create a positive mechanical interlock with the inner ring 413 for maintaining the clamping pressure to sustain the grip on the drumhead.

In FIG. 9 the outer ring 511 is shown as having a series of convolutions along its inner surfaces that border and define the mounting slot and the inner ring 513 is provided with a complementary set of convolutions with the convolutions of the inner and outer rings being arranged to intermesh for providing the desired positive mechanical interlock. In this construction, the outer ring is again preferably an extrusion in order that smooth convolutions may be formed with the desired accuracy and without sharp edges such as would fracture the drumhead.

In each of the arrangements of FIGS. 7, 8 and 9 the outer side wall may include an end extension 317E, 417E, and 517E, respectively, and the drumhead edge may include a projecting tail portion, both being shown as extending inwardly and across the upper face of the inner ring to provide an additional mechanical interlock and to provide an elevated support surface for engagement with the counterhoop 15.

FIG. 10 shows still another clamping ring arrangement wherein the inner ring 613 has a vertically elongated generally tubular configuration characterized by inwardly bowed side walls and the outer ring 611 has its side walls inwardly deformed to present inwardly extending ribs that may be pinched into clamping relation against the inner ring to develop the desired positive mechanical interlock. The outer side wall of the outer ring has an end extension 617E projecting across the face of the inner ring to create an additional mechanical interlock of the type illustrated in FIGS. 5 and 6.

[It should be understood that the description of the preferred form of the invention is for the purpose of complying with Section 112, Title 35, of the U.S. Code and that the claims should be construed as broadly as prior art will permit.]

I claim:

[1. A drum head construction comprising a first ring of generally channel-shaped cross-sectional configuration defining a mounting slot having a full length access opening through said ring along a side thereof that faces in a direction generally normal to the plane of the ring, a plastic drumhead sheet spanning said ring and having a marginal edge extending through said access opening and lining said slot to substantially follow the outline configuration thereof, and a second ring nested in force fit relation in said slot of said first ring to establish said rings in tight fit compressional engagement for exerting clamping pressure against the said marginal edge that lines said slot to grip the same against slippage even when said drumhead is subjected to high tension shock loading, said rings having cooperating portions thereon for defining a mechanical interlock that holds the rings in said tight fit compressional engagement for maintaining said clamping pressure against the said marginal edge.]

[2. A drumhead construction comprising a first ring of generally channel-shaped cross-sectional configuration defining a mounting slot having a full length access opening through said ring along a side thereof that faces in a direction generally normal to the plane of the ring, a plastic drumhead sheet spanning said ring and having a marginal edge extending through said access opening and lining said slot to substantially follow the outline configuration thereof, and a second ring nested in force fit relation in said slot of said first ring to establish said rings in tight fit compressional engagement for exerting clamping pressure against the said marginal edge that lines said slot to grip the same against slippage even when said drumhead is subjected to high tension shock loading, said rings having cooperating portions thereon interacting through the said marginal edge for defining a mechanical interlock that holds the rings in said tight fit compressional engagement for maintaining said clamping pressure against the said marginal edge.]

[3. A drumhead construction comprising a first ring of generally channel-shaped cross-sectional configuration defining a mounting slot having a full length access opening through said ring along a side thereof that faces in a direction generally normal to the plane of the ring, a plastic drumhead sheet spanning said ring and having a marginal edge extending through said access opening and lining said slot to substantially follow the outline configuration thereof, and a second ring nested in force fit relation in said slot of said first ring to establish said rings in tight fit compressional engagement for exerting clamping pressure against the said marginal edge that lines said slot to grip the same against slippage even when said drumhead is subjected to high tension shock loading, said first ring having an outer side wall of greater length than its inner side wall, said outer side wall of said first ring having its free edge portion projecting radially inwardly to overlie said second ring and constitute a mechanical interlock for holding the rings in said tight fit compressional engagement to maintain said clamping pressure against the said marginal edge.]

[4. A drumhead construction comprising a first ring of generally channel-shaped cross-sectional configuration defining a mounting slot having a full length access opening through said ring along a side thereof that faces in a direction generally normal to the plane of the ring, a plastic drumhead sheet spanning said ring and having a marginal edge extending through said access opening and lining said slot to substantially follow the outline configuration thereof, and a second ring nested in force fit relation in said slot of said first ring to establish said rings in tight fit compressional engagement for exerting clamping pressure against the said marginal edge that lines said slot to grip the same against slippage even when said drumhead is subjected to high tension shock loading, said first ring having an outer side wall of greater length than its inner side wall, said outer side wall of said first ring having its free edge portion projecting radially inwardly to overlie said second ring and constitute a mechanical interlock for holding the rings in said tight fit compressional engagement to maintain said clamping pressure against the said marginal edge, with said radially projecting free edge portion having its exterior surface spaced above the upper extremity of said inner side wall.]

[5. A drumhead construction comprising a first ring of generally channel-shaped cross-sectional configuration defining a mounting slot having a full length access opening through said ring along a side thereof that faces in a direction generally normal to the plane of the ring, said ring having an outer side wall of greater length than its inner side wall, a plastic drumhead sheet having a generally circular, horizontal central crown portion, and an outer marginal edge flange, said sheet spanning said ring with said marginal edge flange having an inner diameter corresponding to the diameter of said inner side wall and having a dimension, in the radial direction of said sheet, corresponding to the length of the interior wall surface along a cross-section through said first ring to extend through said access opening and provide an inner surface liner for said slot, and a second ring complemental to and nested in force fit relation in said slot of said first ring to establish said rings in tight fit compressional engagement for exerting clamping pressure against said liner, said outer side wall of said first ring having its free edge portion projecting radially inwardly to overlie said second ring and provide a mechanical interlock for holding the rings in said tight fit compressional engagement to maintain said clamping pressure for gripping said liner, with said radially projecting free edge portion having its exterior surface spaced above the upper extremity of said inner side wall.]

6. [A] *An adhesive-free* drumhead construction comprising a first ring of generally channel-shaped cross-sectional configuration defining a mounting slot having a full length access opening through said ring along a side thereof that faces in a direction generally normal to the plane of the ring, said ring having an outer side wall of greater length than its inner side wall, a plastic drumhead sheet having a generally circular, horizontal central crown portion, an intermediate vertical flange portion depending from the outer margin of said crown portion and constituting a tuning collar, and an outer marginal edge flange, said sheet spanning said ring and said marginal edge flange having an inner diameter corresponding to the diameter of said inner side wall and having a dimension, in the radial direction of said sheet, corresponding to the *combined* length of the interior wall surface *of said longer outer side wall and the other surface extents of the walls of said channel-shaped slot in* [along a cross-section through] said first ring to extend through said access opening and provide an inner surface liner for said slot, and a second ring complemental to and nested in force fit relation in said slot of said first ring to establish said rings in tight fit compressional engagement for exerting clamping pressure against said liner, said outer side wall of said first ring having its free edge portion projecting radially inwardly to overlie said second ring *and said marginal end flange of said sheet* and *to* provide a mechanical interlock [for] holding the rings in said tight fit compressional engagement *and maintaining* [to maintain] said clamping pressure for gripping said liner *without dependance upon any adhesive,* with said radially projecting free edge portion having its exterior surface spaced above the upper extremity of said inner side wall.

[7. A drumhead construction as set forth in claim 3 wherein the said inner side wall of said first ring also has a free edge portion projecting radially outwardly to overlie said second ring.]

[8. A drumhead construction as set forth in claim 3 wherein said second ring has an inverted channel shaped cross-sectional configuration.]

9. A drumhead construction as set forth in claim [3] *6* wherein said second ring is solid and has a generally rectangular cross-sectional configuration.

[10. A drumhead construction as set forth in claim 1 wherein each side wall of said first ring is of a generally V-shape to define a slot having its narrowest width dimension midway of its height and wherein said second ring has a shape complemental to that of said slot to establish said mechanical interlock.]

[11. A drumhead construction as set forth in claim 1 wherein each side wall of said first ring bows inwardly lengthwise thereof to provide an inwardly projecting lengthwise extending bowed portion and said second ring is of hollow tubular cross-sectional configuration and has side walls inwardly bowed to provide complementary lengthwise extending recesses that receive said bowed portions to establish said mechanical interlock.]

12. [A] *An adhesive-free* drumhead construction comprising a first ring of generally channel-shaped cross-sectional configuration defining a mounting slot having a full length access opening through said ring along a side thereof that faces in a direction generally normal to the plane of the ring, said ring having an outer side wall *initially* of greater height than its inner side wall, a plastic drumhead sheet having a generally circular horizontal central crown portion and having a marginal edge, said sheet spanning said ring with said marginal edge extending through said access opening and lining said slot to [substantially] follow the outline configuration thereof *including the inner surface of said outer side wall,* and a second ring complemental to and nested in force fit relation in said slot of said first ring to establish said rings in tight fit compressional engagement for exerting clamping pressure against the said marginal edge that lines said slot *and said outer side wall* to grip the same against slippage even when said drumhead sheet is subjected to high tension shock loads, said outer side wall of said first ring having its free edge portion projecting radially inwardly relative to overlie said second ring *and said marginal edge of said sheet* and provide a positive mechanical interlock holding the rings in said tight fit compressional engagement *and maintaining* [to maintain] said clamping pressure [for] gripping said marginal edge of said sheet *without dependence upon any adhesive,* with the said radially projecting free edge portion presenting an exterior surface providing an upwardly facing mounting seat adapted for engagement with a counter hoop to receive and respond to drum tuning forces applied through the counter hoop for reinforcing and enhancing the mechanical interlock between said rings.

[13. A drumhead construction comprising a first ring of generally channel-shaped cross-sectional configuration defining a mounting slot having a full length access opening through said ring along a side thereof, a plastic drumhead sheet spanning said ring and having a marginal edge extending through said access opening and lining said slot to substantially follow the outline configuration thereof, and a second ring nested in force fit relation in said slot of said first ring to establish said rings in tight fit compressional engagement for exterting clamping pressure against the said marginal edge that lines said slot to grip the same against slippage even when said drumhead is subjected to high tension shock loading, said rings having cooperating portions thereon for defining a mechanical interlock that holds the rings in said tight fit compressional engagement for maintaining said clamping pressure against the said marginal edge.]

*14. An adhesive-free drumhead construction comprising a first ring of generally channel-shaped cross-sectional configuration defining a mounting slot having a full length access opening through said ring along a side thereof, a plastic drumhead sheet spanning said ring and having a marginal edge extending through said access opening and lining said slot in direct contact with the walls thereof and following the outline configuration thereof, and a second ring nested in force fit relation in said slot of said first ring to establish said rings in tight fit compressional engagement for exerting clamping pressure against the said marginal edge that lines said slot to grip the same against slippage even when said drumhead is subjected to high tension shock loading, said rings having cooperating portions thereon for defining a mechanical interlock that holds the rings in said tight fit compressional engagement maintaining said clamping pressure against the said marginal edge; said first ring being of metal and having a generally radially extending bottom wall with an interior surface of substantially annular configuration, and having integral radially inner and radially outer side walls extending from the opposite margins of the bottom wall at substantially right angles to said bottom wall, interior surfaces of said bottom and side walls of said first ring together defining a substantially rectangular outline configuration of said slot as viewed in cross-section; said second ring being of substantially rigid material and having exterior bottom, side and upper faces together defining a substantially rectangular outline configuration as viewed in cross section with the side faces of said second ring being of substantially cylindrical configuration as viewed in elevation and being of substantial axial extent; said cooperating portions of said rings comprising a free edge portion of the first ring integral with an upper margin of said radially outer side wall of said first ring, and said upper face of said second ring; the free edge portion of said first ring having an undersurface extending substantially radially inwardly in overlying close conforming relation to at least a major portion of said upper face of said second ring; and said first and second rings retaining said marginal edge of said plastic drumhead sheet in said slot essentially solely by virtue of a totally mechanical clamping of said plastic drumhead sheet by said rings without dependence upon any adhesive.*

*15. An adhesive-free drumhead construction comprising a first ring of generally channel-shaped cross-sectional configuration defining a mounting slot having a full length access opening through said ring along a side thereof, a plastic drumhead sheet spanning said ring and having a marginal edge extending through said access opening and lining said slot in direct contact with the walls thereof and following the outline configuration thereof, and a second ring nested in force fit relation in said slot of said first ring to establish said rings in tight fit compressional engagement for exerting clamping pressure against the said marginal edge that lines said slot to grip the same against slippage even when said drumhead is subjected to high tension shock loading, said rings having cooperating portions thereon for defining a mechanical interlock that holds the rings in said tight fit compressional engagement for maintaining said clamping pressure against the said marginal edge; said first ring being of sheet metal and having interior surfaces together defining a substantially rectangular outline configuration of said slot as viewed in cross-section; said second ring being of metal and having exterior faces together defining a substantially rectangular outline configuration as viewed in cross-section; said plastic drumhead sheet having a generally circular horizontal central crown portion, and an intermediate generally vertically extending flange portion depending from the outer margin of said crown portion and constituting a tuning collar, said marginal edge of said plastic drumhead sheet joining with said intermediate generally vertically extending flange portion at the radially inner side of said slot and extending about said second ring and having an integral tail portion extending along an upper face of said second ring in overlying relation thereto; said first ring having an integral radially inner wall of sheet metal and of substantially cylindrical configuration as viewed in elevation including an upper free end and extending substantially vertically throughout its length and having an integral radially outer wall of sheet metal including a substantially vertically extending portion and a substantially radially extending free edge portion extending from the upper margin of said substantially vertically extending portion and overlying said tail portion of said drumhead sheet marginal edge; and said free edge portion having an exterior surface providing an upwardly facing mounting seat directly above said tail portion and adapted for engagement with a counter hoop to receive and respond to drum tuning forces applied through the counter hoop to clamp said tail portion of said plastic drumhead sheet against the upper face of said second ring.*

*16. An adhesive-free drumhead construction comprising a first ring of generally channel-shaped cross-sectional configuration defining a mounting slot having a full length access opening through said ring along a side thereof, a plastic drumhead sheet spanning said ring and having a marginal edge extending through said access opening and lining said slot and in direct contact with the walls thereof and following the outline configuration thereof, and a second ring nested in force fit relation in said slot of said first ring to establish said rings in tight fit compressional engagement for exerting clamping pressure against the said marginal edge that lines said slot to grip the same against slippage even when said drumhead is subjected to high tension shock loading, said rings being rectangular in cross-section and having cooperating portions thereon defining a mechanical interlock that holds the rings in said tight fit compressional engagement maintaining said clamping pressure against the said marginal edge; said second ring being of substantially rigid material and having a substantially uniform cross-sectional outline configuration throughout substantially its entire circumference with said cross-sectional configuration having a median lying on a vertical line dividing the area of said cross-sectional outline configuration into two equal parts; said first ring being of metal of sheet configuration and having an interior surface defining said slot and presenting a substantially uniform outline configuration in cross-section of dimensions substantially equal to the corresponding dimensions of said second ring cross-sectional outline configuration plus the thickness dimension of said marginal edge lining said slot, about substantially the entire circumference of said first*

*ring; said first ring having an exterior surface providing an upwardly facing mounting seat for engagement by a counterhoop at a region substantially directly above said median of said cross-sectional outline configuration of said second ring to receive and respond to drum tuning forces applied through the counterhoop for reinforcing and enhancing the mechanical interlock between said ring; and said first and second rings retaining said marginal edge of said plastic drumhead sheet in said slot essentially solely by virtue of a totally mechanical clamping of said plastic drumhead sheet by said rings without dependence upon any adhesive.*

*17. An adhesive-free drumhead construction comprising a first ring of generally channel-shaped cross-sectional configuration defining a mounting slot having a full length access opening through said ring along a side thereof, a plastic drumhead sheet spanning said ring and having a marginal edge extending through said access opening and lining said slot in direct contact with walls thereof to follow the outline configuration thereof, and a second ring nested in force fit relation in said slot of said first ring to establish said rings in tight fit compressional engagement for exerting clamping pressure against the said marginal edge that lines said slot to grip the same against slippage even when said drumhead is subjected to high tension shock loading, said rings having cooperating portions thereon for defining a mechanical interlock that holds the rings in said tight fit compressional engagement maintaining said clamping pressure against the said marginal edge; said second ring being of metal providing a substantially rectangular cross-sectional outline configuration and including a first annular portion thereof having a first radial dimension between radially inner and radially outer margins thereof and a second annular portion having a second radial dimension between radially inner and radially outer margins thereof substantially less than said first annular portion and being located above said first annular portion; said marginal edge of said plastic drumhead sheet substantially conforming to the cross-sectional outline configuration of said second ring and being in conforming contacting relation with said second ring; said first ring being of metal and having an interior surface defining said slot with said outline configuration of said slot substantially conforming with the cross-sectional outline configuration of said*

*second ring, said first ring interior surface engaging said plastic drumhead sheet at the radially inner and radially outer margins of said second portion of said second ring and clamping said drumhead sheet in overlying relation to said first annular portion of said second ring, locking said second ring in said slot of said first ring and preventing displacement of said second ring relative to said first ring; and said first and second rings retaining said marginal edge of said plastic drumhead sheet in said slot essentially solely by virtue of a totally mechanical clamping of said plastic drumhead sheet by said rings without dependence upon any adhesive.*

References Cited

The following references, cited by the Examiner, are of record in the patented file of this patent or the original patent.

UNITED STATES PATENTS

| | | | |
|---|---|---|---|
| 18,323 | 10/1857 | Coffin | 160—396 |
| 107,136 | 9/1870 | Watkins | 160—371 |
| 1,009,467 | 11/1911 | Bryant | 84—411 |
| 1,121,909 | 12/1914 | Elkins et al. | 84—411 |
| 1,678,136 | 7/1928 | Dewey | 84—260 |
| 1,791,761 | 2/1931 | Larrabee | 346—138 |
| 1,894,068 | 1/1933 | Soderberg | 84—415 |
| 2,085,093 | 6/1937 | Gauthier | 346—138 |
| 2,524,592 | 10/1950 | Cordes | 84—411 |
| 2,526,912 | 10/1950 | Swanson | 160—90 |
| 2,660,499 | 11/1953 | Norquist | 52—613 |
| 2,724,893 | 11/1955 | O'Connor et al. | |
| 2,843,926 | 7/1958 | Turner. | |
| 2,830,484 | 4/1958 | Erwin | 84—414 |
| 2,934,989 | 5/1960 | Belli et al. | 84—411 |

FOREIGN PATENTS 566,816 12/1932 Germany.

OTHER REFERENCES

Downbeat Magazine, October 3, 1957, "New Plastic Damp-Proof Drumhead," Camco Drum Accessories Co., Oak Lawn, Ill.

RICHARD B. WILKINSON, *Primary Examiner.*

S. A. WAL, *Assistant Examiner.*